United States Patent [19]
Bauer et al.

[11] 3,799,433
[45] Mar. 26, 1974

[54] SPACE THERMOSTAT WITH AUTOMATIC SOLID STATE ANTICIPATOR

[75] Inventors: Frederick T. Bauer; Anthony C. Cairo; Ronald E. Holkeboer, all of Holland, Mich.

[73] Assignee: Robertshaw Controls Company, Richmond, Va.

[22] Filed: Mar. 7, 1973

[21] Appl. No.: 338,987

[52] U.S. Cl. ............... 236/68 B, 219/511, 337/377
[51] Int. Cl. ........................................... G05d 23/30
[58] Field of Search .................... 219/511; 337/377; 236/68 B

[56] References Cited
UNITED STATES PATENTS
3,063,001  11/1962  White .................................. 321/16
3,445,632  5/1969  Lewis .................................. 219/511

Primary Examiner—William E. Wayner
Attorney, Agent, or Firm—Malcolm R. McKinnon

[57] ABSTRACT

A space thermostat embodying an automatic solid state anticipator, the anticipator including a parallel diode circuit connected across a heater resistor with the diodes poled in opposite directions and effective to clip the peaks of an A.C. signal applied to the resistor thereby enabling the anticipator to function with diverse power sources having different output voltage and/or current values.

14 Claims, 4 Drawing Figures

PATENTED MAR 26 1974 3,799,433
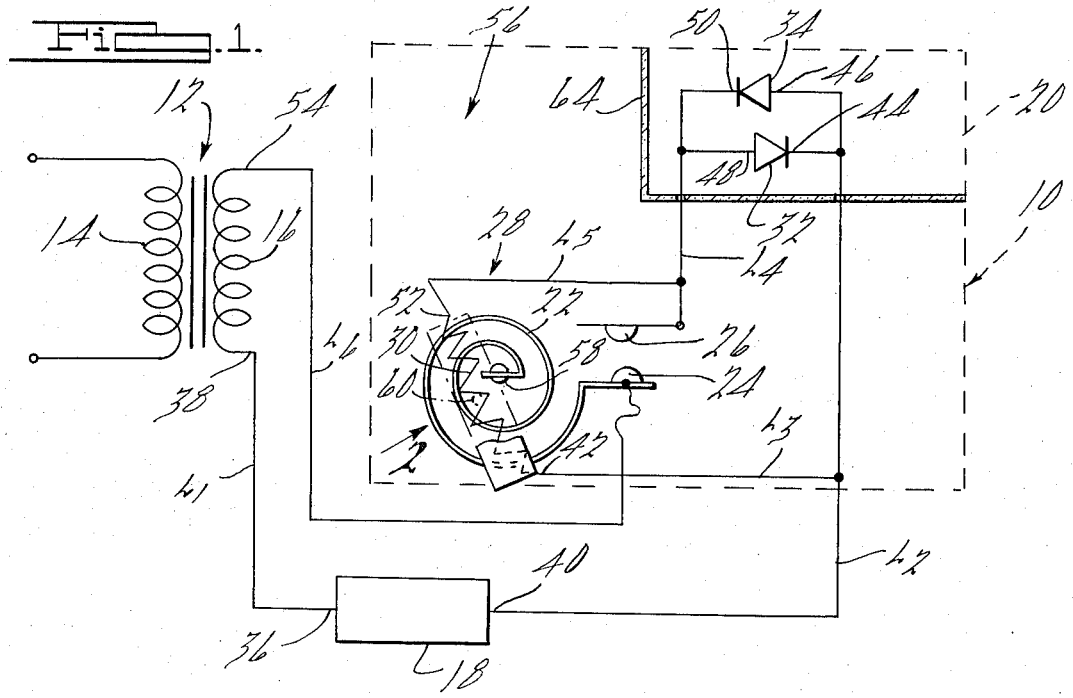
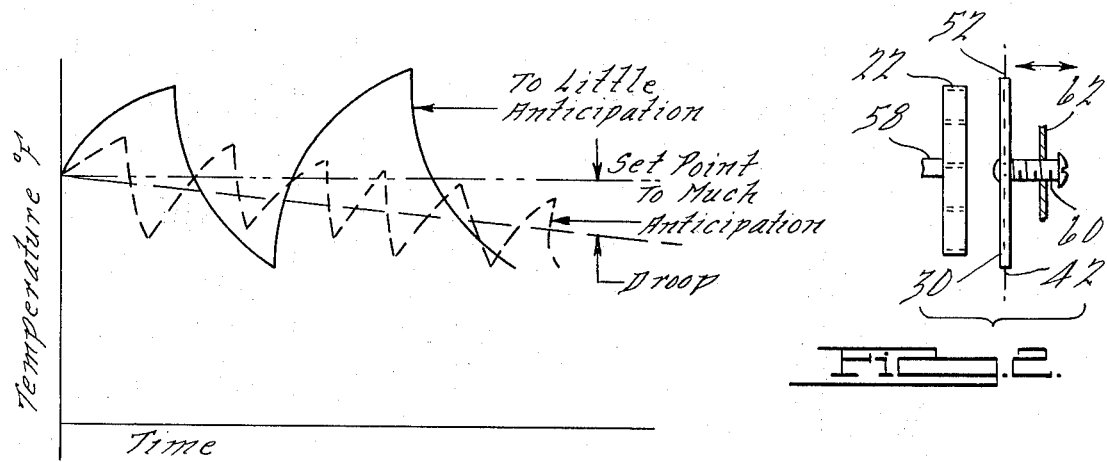
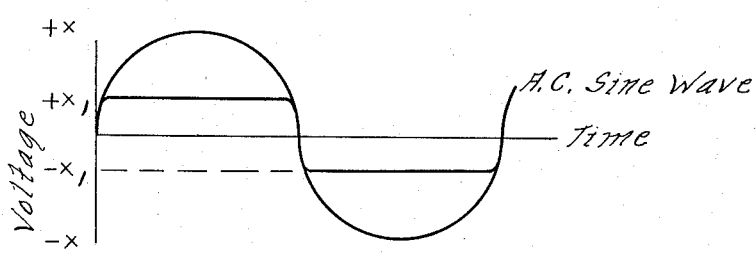

SPACE THERMOSTAT WITH AUTOMATIC SOLID STATE ANTICIPATOR

BRIEF SUMMARY OF THE INVENTION

This invention relates to space thermostats and, more particularly, to an improved space thermostat incorporating an improved automatic solid state anticipator operable with diverse power sources having different output voltage and/or current values.

Heretofore, various types of space thermostats have been utilized to control the operation of furnaces in an effort to provide accurate control of room temperatures, and most prior thermostats in common use contain a thermostatic sensing element that requires local heat to achieve the desired response. The heat used to create the "local heating" in and/or near the thermostatic element when the space thermostat is in the "heat on" cycle is resistive, the local heating of the thermostatic element reducing the dependence on ambient space temperature required to actuate the thermostat from its closed to its open position. The local heating thus anticipates the subsequent delivery of heat remaining in the furnace when the space thermostat opens and also compensates for the delay in the response of the thermostatic sensing element. Conventional thermostats provide the aforementioned anticipation (local heating) by use of the following simplified power equation: $P = I^2R$ (where $P$ = watts; $I$ = current in amperes and $R$ = resistance in ohms). However, the control current for each different furnace model may be different, hence "I" is a variable. Since "R" is a thermostat component, it can be controlled in the space thermostat during the course of the manufacture thereof, such control usually being accomplished by providing a wiper adjustment over a known resistance element with the result that repeatable resistive values can be achieved. It will thus be understood that since "I" varies with different furnace models but the same anticipator heat output is required for the various furnace models, the value of "R" must be adjusted for the value of the current in each particular furnace system. Consequently, with prior space thermostats, the value of "I" of the furnace control system must be known or the thermostat will not provide the correct desired anticipation. As illustrated in FIG. 3 of the drawings hereof, if the anticipation is too large, the thermostat will droop causing the thermostatic element to retain too much heat, and if too little anticipation is provided, wide fluctuations in room temperature will occur.

Prior variable resistance types of anticipators are also subject to the defect that if mechanical electrical connections are not made correctly, then such connections have increased resistance giving rise to heat generated where it is not needed or desired. Prior variable resistance types of anticipators are also subject to burn out if the resistance in the wiper contact starts to climb because of dust, dirt and other foreign materials.

Another practical problem encountered with prior variable resistance type anticipators is caused by the fact that the value of the current must be known in the particular furnace system in which the space thermostat is utilized, and many anticipators are burned out each year because of wrong settings. A further practical problem with prior mechanical type as well as fixed type anticipators is caused by the fact that different control currents are used with different fuels. For example, it is common in mobile home furnaces to use 0.4 amperes for oil and 0.2 amperes for gas. Some furnaces can be converted from oil to gas merely by changing the fuel gun, such practice being common especially when a mobile home is built for sale on a lot. Since the type of fuel that will be utilized will not be known until the customer decides where to park the mobile home, a furnace and space thermostat that leaves the factory set up for oil, in some cases, must be converted to gas and it is not unusual for the thermostat to be left set for oil with the result that the anticipator provides too little anticipation and the customer experiences large temperature swings in his home.

An object of the present invention is to overcome disadvantages in prior thermostats and thermostat anticipators of the indicated character and to provide an improved space thermostat incorporating an improved anticipator that will function under varying voltage and/or current conditions by adjusting itself to the furnace control system utilized.

Another object of the invention is to provide an improved space thermostat that will operate with varying voltage and/or current configurations with virtually no adjustment and at the same time provide the same anticipatory fixed heat output.

Another object of the invention is to provide an improved space thermostat that obviates the need for mechanical electrical connections that adjust the resistance of the space thermostat anticipator and can give rise to failure.

Another object of the invention is to provide an improved space thermostat incorporating improved means for making fine adjustments by locating the anticipator heating element at different positions with respect to the thermostatic element.

Another object of the invention is to reduce the cost of anticipators for space thermostats.

Still another object of the invention is to provide an improved space thermostat that is relatively simple in construction, economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a schematic illustration of the circuitry and structure of a space thermostat embodying the present invention, showing the same installed in a conventional furnace control system;

FIG. 2 is a cross-sectional view of a portion of the structure illustrated in FIG. 1, looking in the direction of the arrow designated 2;

FIG. 3 is a time-temperature graph illustrating the effects of too little and too much anticipation; and FIG. 4 is a graph illustrating the manner in which an A.C. sine wave behaves through the diodes illustrated in FIG. 1.

DETAILED DESCRIPTION

Referring to the drawings, and more particularly to FIG. 1 thereof, the circuitry and structure of a space thermostat, generally designated 10, embodying the present invention is schematically illustrated therein. As shown in FIG. 1, the space thermostat 10 is adapted to be connected to a conventional step down transformer 12 having a primary winding 14 and a secondary winding 16, the primary winding 14 being adapted to be connected to a conventional source of 120 volt alternating current while, in the embodiment of the invention illustrated, the secondary winding 16 is connected to the space thermostat 10 and to a conventional furnace actuator 18 so as to cause the actuator, when energized, to operate the furnace.

The space thermostat 10 includes a housing 20 which may be of any desired size and configuration and which is adapted to be mounted in any desired or conventional manner on a wall of a home or other building which is to be heated by a furnace (not shown) controlled by the thermostat 10. The space thermostat 10 includes a conventional spirally wound bimetallic thermostatic element 22 having contacts 24 and 26 associated therewith, the contacts 24 and 26 being open when the ambient room temperature is above the control point of the thermostat and being closed when the room temperature falls below the thermostat control point. The space thermostat 10 also includes an anticipator, generally designated 28, comprised of a fixed resistance heating element 30 and oppositely poled silicon diodes or rectifiers 32 and 34.

As shown in FIG. 1, the space thermostat 10 is electrically connected to and adapted to control the furnace actuator 18. The terminal 36 of the actuator 18 is electrically connected to the terminal 38 of the secondary winding 16 of the step down transformer 12 by the lead $L_1$ while the terminal 40 of the actuator 18 is electrically connected to the terminal 42 of the heating element 30 by the leads $L_2$ and $L_3$ and to the terminals 44 and 46 of the oppositely poled diodes 32 and 34, respectively, by the lead $L_2$. The terminals 48 and 50 of the diodes 32 and 34, respectively, are connected to the contact 26 by the lead $L_4$ and to the terminal 52 of the heater 30 by the lead $L_5$. The contact 24 is connected to the terminal 54 of the secondary winding 16 of the step down transformer 12 by the lead $L_6$. It will thus be seen that the heating control circuit shown in FIG. 1 includes as primary elements a power source comprising the step down transformer 12 having its primary winding 14 connected across a commercial power source and its secondary winding 16 supplying the required voltage to the furnace actuator 18 so as to cause the actuator, when energized, to operate the furnace. It will also be seen that the actuator 18 is electrically connected to the terminal 38 of the secondary winding 16 by the lead $L_1$ and to the terminal 54 of the secondary winding through the anticipator 28 and the contacts 24 and 26. As shown in FIGS. 1 and 2, the contact 24 is carried by the free end of the bimetallic thermostatic element 22 while the inner end of the spirally wound thermostatic element 22 is supported by a wall 56 of the housing 20, as at 58, in any desired or conventional manner. The contact 26 is also supported by the housing in any desired or conventional manner.

As shown in FIGS. 1 and 2, the heating element 30 is adjustably mounted in closely spaced relationship with respect to the thermostatic element 22, the heating element 30 being illustrated as being carried by a screw 60 threadably engaging a fixed support 62 secured to the housing 20. With such a construction, the heating element 30 may be physically moved toward and away from the thermostatic element 22 by turning the screw 60 in the appropriate direction so as to vary the heat transfer characteristics of the heater 30 relative to the thermostatic element 22 by varying the distance therebetween. It will be understood that the heating element 30 may be of any desired or conventional construction and it may take the form of a flat thin blade or of any other desired conventional resistor. Numerous commercial types of heaters may be utilized without restriction as required in prior art types of anticipators.

The silicon diodes 32 and 34 generate heat when energized and therefore must be thermally isolated from the thermostatic element 22. Such thermal isolation may be accomplished by placing the diodes 32 and 34 at a remote distance from the thermostatic element 22 to take advantage of natural convection currents and to prevent radiant energy emitted by the diodes from reaching the thermostatic element 22. As an alternative, a thermal barrier (schematically illustrated at 64) formed of any desired or conventional heat insulating material may be provided in the housing between the rectifiers 32 and 34 and the thermostatic element 22.

When the contacts 24 and 26 are closed, the A.C. sine wave passing through the diodes 32 and 34 behaves as illustrated in FIG. 4 and the diodes 32 and 34 act to clip off the peaks of the A.C. sine wave. The $X_1$ and $-X_1$ values shown are the forward voltage drop across the diodes when they are turned on. The most common rectifiers are silicon and, hence, upon insertion it is found that the $X_1$ and $-X_1$ value is 0.6 volts. It has been found that silicon rectifiers for this application are extremely reliable and very low in cost.

From experience, it is generally desired to raise the temperature of the thermostatic element 22 three to four degrees fahrenheit within three minutes to obtain the proper anticipation of the system and the local heat required is generally 100 milli-watts for three minutes. Thus, the value of $R = (0.6)^2/0.100 = 3.6$ ohms. It will be understood that these values are not meant to constrain the bounds of this invention and are merely illustrative of one of the possible ways that it can be accomplished.

In the operation of the thermostat 10, when the contacts 24 and 26 are closed, the silicon diodes 32 and 34 only conduct when the forward voltage drop is reached and they allow all other voltage to pass except the forward voltage drop. Hence, a maximum of 0.6 volts is applied to the heater 30 in parallel with the diodes 32 and 34 in each mode of the sine wave. Thus, the anticipator will always provide the same fixed heat output even though there are wide variations in voltage and/or current conditions. Fine heating adjustments may be made by locating the heating element 30 at different positions with respect to the thermostatic element 22 by rotating the screw 60 in the proper direction.

From the foregoing, it will be seen that space thermostats incorporating anticipators embodying the present invention require no mechanical electrical adjustments, such as wiper adjustments, for any normal voltage or current input to produce the required amount of local heat, and that anticipators embodying the present invention are not subject to voltage or current fluctuations. It will also be seen that space thermostat anticipators embodying the present invention may be adjusted mechanically to vary the amount of local heat applied to the thermostatic element without mechanically adjusting any electrical contacts and that there are no anticipator electrical contacts subject to wear or fouling which could cause eventual burn out. It will also be seen that the present invention provides an extremely low cost means for producing local or anticipatory heat for a space thermostat.

While a preferred embodiment of the invention has been illustrated and described, it will be understood that various changes and modifications may be made without departing from the spirit of the invention.

What is claimed is:

1. In a thermostat, the combination including a thermostatic element, an anticipator operatively associated with said thermostatic element, said anticipator including an electrical resistance heater disposed adjacent said thermostatic element and effective, when energized, to heat said element, and a pair of oppositely poled rectifiers electrically connected in parallel with said heater and effective to clip the peaks of an A.C. signal applied thereto.

2. The combination as set forth in claim 1 including means for adjusting the physical position of said heater relative to said thermostatic element.

3. The combination as set forth in claim 1 wherein said rectifiers are silicon diodes.

4. The combination as set forth in claim 1 wherein said rectifiers are thermally isolated from said thermostatic element.

5. The combination as set forth in claim 1 wherein means is provided for thermally insulating said rectifiers from said thermostatic element.

6. In a furnace control system, the combination including furnace actuator means adapted to be connected to a source of A.C. current, thermostatic switching means, electrical heating means operatively associated with said switching means, and a pair of oppositely poled rectifiers having a predetermined voltage drop and electrically connected in parallel with said heating means, said rectifiers being effective to clip the peaks of an A.C. signal applied to said heating means.

7. The combination as set forth in claim 6 including means for adjusting the physical position of said heating means relative to said thermostatic switching means.

8. The combination as set forth in claim 6 wherein said rectifiers include a parallel silicon diode circuit.

9. The combination as set forth in claim 6 wherein said rectifiers are thermally isolated from said thermostatic switching means.

10. The combination as set forth in claim 6 including means for thermally insulating said rectifiers from said thermostatic switching means.

11. A space thermostat for controlling ambient temperature, said thermostat comprising, in combination, a thermally responsive member, a pair of contacts operated by said thermally responsive member from an open position to a closed position upon a decrease in the ambient temperature, an electrical heater mounted adjacent said thermally responsive member and adapted to locally heat said thermally responsive member, and a parallel rectifier circuit connected across said heater and having a pair of rectifiers poled in opposite directions and effective to clip the peaks of an A.C. signal applied to said heater upon closure of said contacts.

12. The combination as set forth in claim 11 including means for adjusting the physical position of said heater relative to said thermally responsive member.

13. The combination as set forth in claim 12 wherein said rectifiers are silicon diodes.

14. The combination as set forth in claim 13 including means thermally isolating said diodes from said thermally responsive member.

* * * * *